July 1, 1924.

E. W. GOODRICK

COOKING VESSEL

Filed Aug. 7, 1922

1,499,364

INVENTOR
Edward W. Goodrick
by Parker & Rockwood
ATTORNEYS.

Patented July 1, 1924.

1,499,364

UNITED STATES PATENT OFFICE.

EDWARD W. GOODRICK, OF BUFFALO, NEW YORK.

COOKING VESSEL.

Application filed August 7, 1922. Serial No. 580,047.

*To all whom it may concern:*

Be it known that I, EDWARD W. GOODRICK, a citizen of the United States, residing at Buffalo, in the county of Erie and State of New York, have invented a new and useful Improvement in Cooking Vessels, of which the following is a specification.

This invention relates to cooking boilers or cookers of the type generally adapted for household, hotel or restaurant use and of the so-called "double boiler" type, wherein the food or material to be cooked is contained in an inner container or compartment which is insulated from the radiant heat of the fire.

The objects of the present invention are to provide a cooking boiler in which material may be cooked uniformly throughout with a minimum consumption of fuel; also to provide a cooking boiler which will maintain the cooked material in a heated condition for a relatively long time after the heat applied to the boiler is discontinued, and also to provide other improvements in cooking boilers or vessels in the other respects hereinafter set forth and claimed.

The cooker of the present invention includes an outer vessel or pan constructed of suitable metal or the like, and which may be of any desired shape or form, and an inner container which is adapted to hold the material to be cooked and which is suspended in the outer vessel and is preferably of such design and constructed of suitable material so that it may be removed from the outer vessel when the material has been cooked and placed in a suitable stand or the like, whereby the material may be served therefrom.

Figure 3:
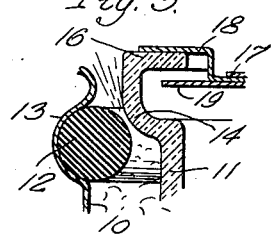
Fig. 3 is a vertical section of a portion thereof on an enlarged scale.
Figure 4:
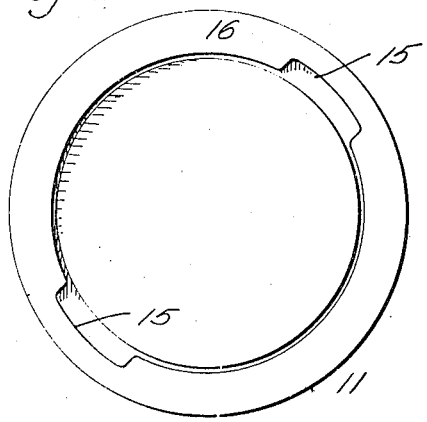
Fig. 4 is a plan view of the inner container thereof.
Figure 5:
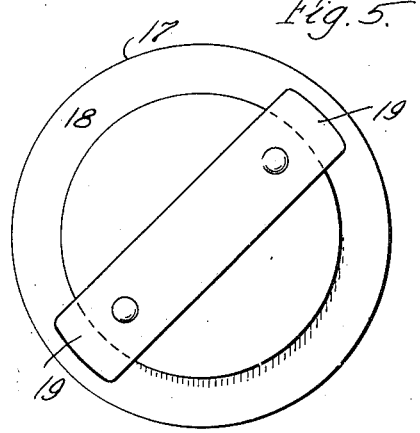
Fig. 5 is a bottom plan view of the lid for the inner container.

In the drawings, 10 designates the outer vessel or pan and 11 the inner container which is adapted to hold the food or material to be cooked. When in use, the outer vessel is partly filled with water or other liquid, and the inner container is so suspended in the outer vessel that when the water in the outer vessel is heated and the steam generated in the vessel or pan attains a certain pressure, some of the steam is permitted to pass over to the top or upper side of the inner container whereby the entire outer surface and top of the inner container is surrounded by boiling liquid or steam. This suspension of the innei container in the outer vessel is preferably accomplished by providing a supporting part or member between the outer vessel and the inner container. In the embodiment of the invention illustrated, the supporting part or member comprises a resilient ring or gasket 12 which engages both the outer vessel and the inner container and supports the inner container in such manner that when the steam in the vessel has reached a certain pressure, the inner container is lifted slightly, thereby permitting some of the steam to pass over the top of the container, as illustrated in Fig. 3. In the embodiment shown, the ring or gasket 12, which may be composed of rubber or other suitable material, rests in a depression or groove 13 in the outer vessel and is adapted to engage a shoulder 14 formed on the inner container, whereby the inner container is supported thereon. It is obvious that this ring may be attached in other ways, or may be composed of material other than the resilient material referred to. The use of a ring of rubber or other resilient material is preferred for the reason that after the vessel is removed from the fire, or heating of the vessel has been discontinued, the steam pressure in the vessel lowers and the steam in the upper part of the vessel condenses. As soon as the steam pressure lowers, the inner container, which has been lifted slightly by the steam under pressure, resumes its seat on the ring 12 and by reason of the resilient character of that ring, a firm seal is effected between the inner container and the ring or seat 12. As the steam pressure in the vessel lowers, a partial vacuum is created in the space in the vessel which is not occupied by the liquid, thereby insulating the sides of the inner container so that food or other material in the container will retain its heat for a relatively long period.

The resilient ring or support 12 provides a cushion suspension or support for the inner container and prevents the inner container, which is preferably constructed of glass, porcelain or other frangible material, from being broken or damaged as the container is placed in the vessel or removed therefrom, or when the vessel is moved from place to place with the container therein.

The inner container is preferably provided with a lid so attached that the inner container may be lifted out of the vessel by the lid. In the preferred form illustrated, this is accomplished by providing suitable notches or recesses 15 in the upper flange or lip 16 of the container and providing a lid 17 having a flange 18 adapted to overlie flange 16 of the container, and tongues 19 projecting from its bottom at the sides thereof and spaced apart from its flange 18, which tongues are adapted to enter the recesses and upon turning of the lid to engage beneath the unrecessed portions of the flange. The lid is also preferably provided with a handle 20 whereby the inner container may be readily lifted by the handle and upon turning the lid 17 until the tongues 19 again register with the notches 15, the lid may be readily removed.

Figure 1:
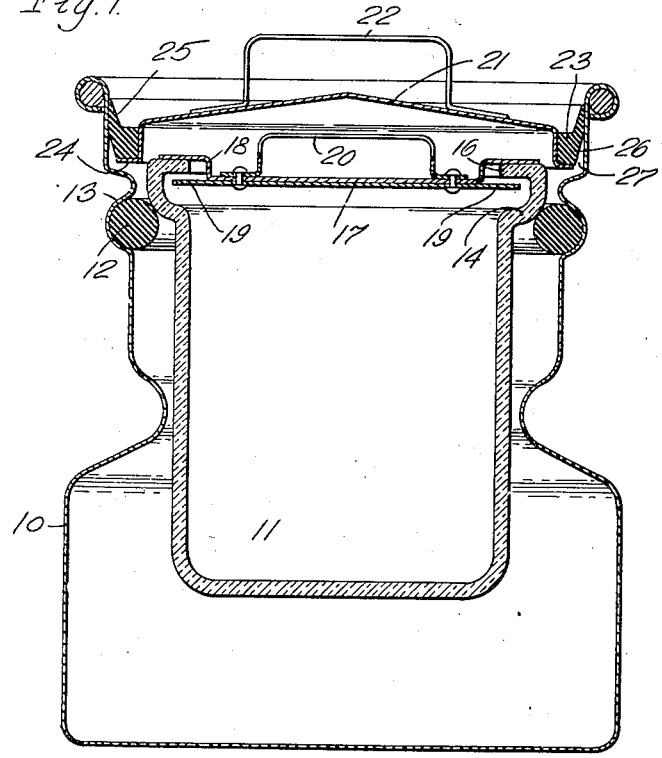
Fig. 1 is a vertical section of a boiler embodying the invention.
Figure 2:
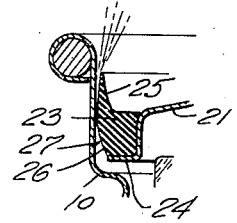
Fig. 2 is a vertical section of a portion thereof, on an enlarged scale.

The vessel 10 is preferably provided with a cover 21, provided with a handle 22, and preferably adapted to fit within the mouth of the vessel. There are provided means for releasably sealing the cover to the mouth of the vessel in such manner that the cover normally closes the mouth of the vessel but permits of the escape of some steam when excessive steam pressure is generated in the vessel. This is preferably accomplished by inserting a resilient gasket or the like between the cover and the walls of the vessel mouth. In the embodiment of the invention illustrated, the cover 21 is provided with a resilient gasket or the like 23, which rests on a suitable shoulder or flange 24 of the cover and which engages the inner sides of the mouth of the vessel when the cover is in position therein to normally prevent the escape of steam from the mouth of the vessel but by reason of its resilient character to permit of the escape of some of the steam in case excessive steam pressure is generated in the vessel, as illustrated in Fig. 2. The gasket 23 is preferably provided with an upwardly extending reduced annular flange or tongue 25 and an inclined outer edge 26 whereby there is provided between the gasket and the mouth of the vessel a recess 27, which with the tongue 25 ensures that excessive pressure in the vessel will be relieved. The resilient support for the frangible inner container facilitates the passage of steam from the lower part of the vessel 10 to the upper part of the vessel and over and around the lid of the inner container, whereby steam or boiling water contacts with the entire outer surface of the inner container and lid when sufficient steam pressure has been generated in the vessel and also prevents breakage of or damage to the inner container when the vessel or the container is being handled. In addition, by reason of the firm seating of the inner container on the resilient support or ring when steam pressure falls in the vessel, air which has been forced out of the vessel by the steam while the device is being heated is not replaced and a partial vacuum is created in the vessel at the sides of the container and at the upper side of the inner container by the sealing action of the vessel cover which permits of the contents of the inner container being maintained in a heated condition or being partially cooked without the use of fuel, once sufficient steam pressure has been generated in the vessel.

I claim as my invention:

1. In a cooker, the combination of an outer vessel adapted to contain a liquid to be heated, a cover on said vessel, an inner container in said vessel and adapted to contain material to be cooked, a lid on said inner container, the sides and lid of said inner container being spaced apart from the sides and cover of said vessel, means at the sides of said container for permitting the escape of air and steam under pressure over said container lid when steam under pressure is generated in said vessel, means between said vessel cover and the mouth of said vessel for automatically permitting the escape of air and steam under pressure passing over said container lid when the steam attains a predetermined pressure, said first-named means sealing the space between the sides of said container and said vessel and preventing the re-entry of air therein when steam pressure in said vessel is lowered, and said second-named means automatically sealing said cover to said vessel and preventing the re-entry of air into the space between said cover and said container lid when the steam pressure is lowered.

2. In a cooker, the combination of an outer vessel adapted to contain liquid to be heated, an inner container in said vessel and adapted to contain material to be cooked, a resilient supporting and releasable sealing ring between the sides of said container and the inner sides of said vessel, a cover on said vessel, and automatically releasable sealing means between said cover and said vessel.

3. In a cooker, the combination of an outer vessel adapted to contain liquid to be heated, a cover for said vessel, an inner container suspended in said outer vessel, a lid for said container, a steam space between said container lid and the cover of said vessel, means between said container and said vessel for permitting steam to pass from said vessel to said steam space when steam is generated to a predetermined pressure in said vessel and for sealing said container to said vessel when the steam pressure lowers, and means between said cover and the vessel for automatically permitting steam to escape from said vessel as the pressure of steam in said vessel and steam space rises and for automatically sealing the cover to said vessel to prevent the entry of air into said vessel when the steam pressure in said vessel lowers.

EDWARD W. GOODRICK.